(12) United States Patent
Fesenmyer et al.

(10) Patent No.: US 9,266,404 B2
(45) Date of Patent: Feb. 23, 2016

(54) FLOOR CONSOLE

(71) Applicant: Ford Global Technologies, LLC, Dearborn, MI (US)

(72) Inventors: Chris Emery Fesenmyer, Flat Rock, MI (US); Scott Simon, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 14/319,134

(22) Filed: Jun. 30, 2014

(65) Prior Publication Data

US 2015/0375595 A1     Dec. 31, 2015

(51) Int. Cl.
| | |
|---|---|
| *B60R 11/06* | (2006.01) |
| *B60H 1/00* | (2006.01) |
| *B60N 2/46* | (2006.01) |
| *B60R 16/037* | (2006.01) |
| *F16F 9/02* | (2006.01) |
| *B60R 7/04* | (2006.01) |

(52) U.S. Cl.
CPC .......... *B60H 1/00271* (2013.01); *B60N 2/4633* (2013.01); *B60R 7/04* (2013.01); *B60R 16/037* (2013.01); *F16F 9/0209* (2013.01)

(58) Field of Classification Search
CPC .... B60H 1/00271; B60N 2/4633; B60R 7/04; B60R 16/037; F16F 9/0209
See application file for complete search history.

(56) References Cited

U.S. PATENT DOCUMENTS

| | | | |
|---|---|---|---|
| 4,934,750 A | 6/1990 | Eichler et al. | |
| 5,390,976 A * | 2/1995 | Doughty | B60N 2/4686 297/115 |
| 8,403,416 B2 | 3/2013 | Muck et al. | |

FOREIGN PATENT DOCUMENTS

| | | |
|---|---|---|
| DE | 10302291 | 8/2004 |
| DE | 102005006977 | 8/2006 |

OTHER PUBLICATIONS

Center Console Storage Armrest—Mini Gas Strut—Mercedes-Benz Forum, www.benzworld.org/forums/w124-e-ce-d-td-class/1704098-center-console-storage-armrest-mini-gas.html, Apr. 17, 2014 (4 pages).

* cited by examiner

*Primary Examiner* — Lori L Lyjak
(74) *Attorney, Agent, or Firm* — Vichit Chea; Bejin Bieneman PLC

(57) ABSTRACT

A floor console includes a climate control unit. A bracket of the floor console unit includes an interior surface facing the climate control unit and an exterior surface opposite the interior surface. An armrest is supported by the bracket and is moveable relative to the bracket. A gas spring extending from a first end connected to the armrest to a second end connected to the exterior surface of the bracket. The connection of the second end of the gas spring to the exterior surface of the bracket reduces packaging constraints for the climate control unit on the interior surface of the bracket.

17 Claims, 4 Drawing Sheets

FLOOR CONSOLE

BACKGROUND

The location or air registers in vehicles may be designed to maximize the effectiveness of the heating/ventilation/air condition (HVAC) of the vehicle and to direct air at a desired area of an occupant's body. A theoretical point in the vehicle that is referred to as the "H-point" may be used to identify the location of the air registers. The H-point is typically identified as the pivot point between the torso and upper legs of an occupant, i.e., through the hips, of a 50% male. As such, an occupant sits relatively higher in a vehicle that is designed to have a relatively high H-point and, conversely, an occupant sits relatively lower in a vehicle that is designed to have a relatively low H-point.

Since the locations of various areas of the occupant's body in the vehicle is dependent on the H-point, the most effective location of the air registers may be designed based on the H-point to provide the registers to be directed at the desired area of the occupant's body. However, the architecture of the vehicle and packaging of various components limits the location of the air registers and may prevent the placement of the air registers in the most effective location.

As one example, the vehicle may include a floor console between the driver seat and the front passenger seat. The floor console may include an armrest that is pivotable between an open position to expose a storage compartment in the floor console and a closed position to cover the storage compartment. The floor console may include an air register facing rearwardly into a rear passenger area of the vehicle. The H-points of the occupants in the rear passenger area may be used to determine the most effective location of the air register. However, the limited area between the driver seat and the front passenger seat, the location and design of the storage compartment, and the location and design of the arm rest are all limiting factors on placement of the air register. As such, there remains an opportunity to design a floor console that allows for effective placement of the air register.

DETAILED DESCRIPTION

Figure 1:
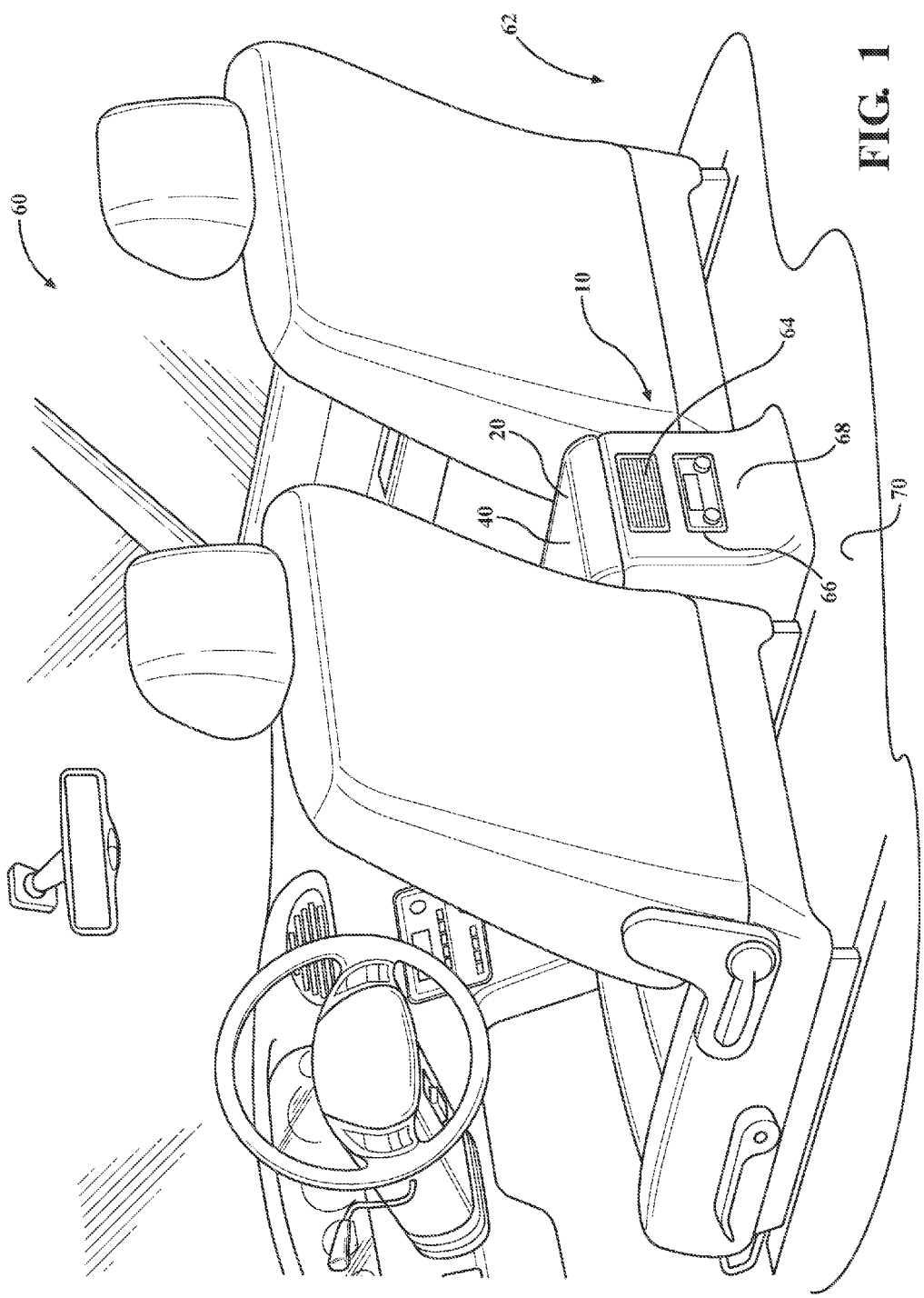
FIG. 1 is a perspective view a floor console in a vehicle viewed from a rear passenger area of the vehicle.
Figure 2:
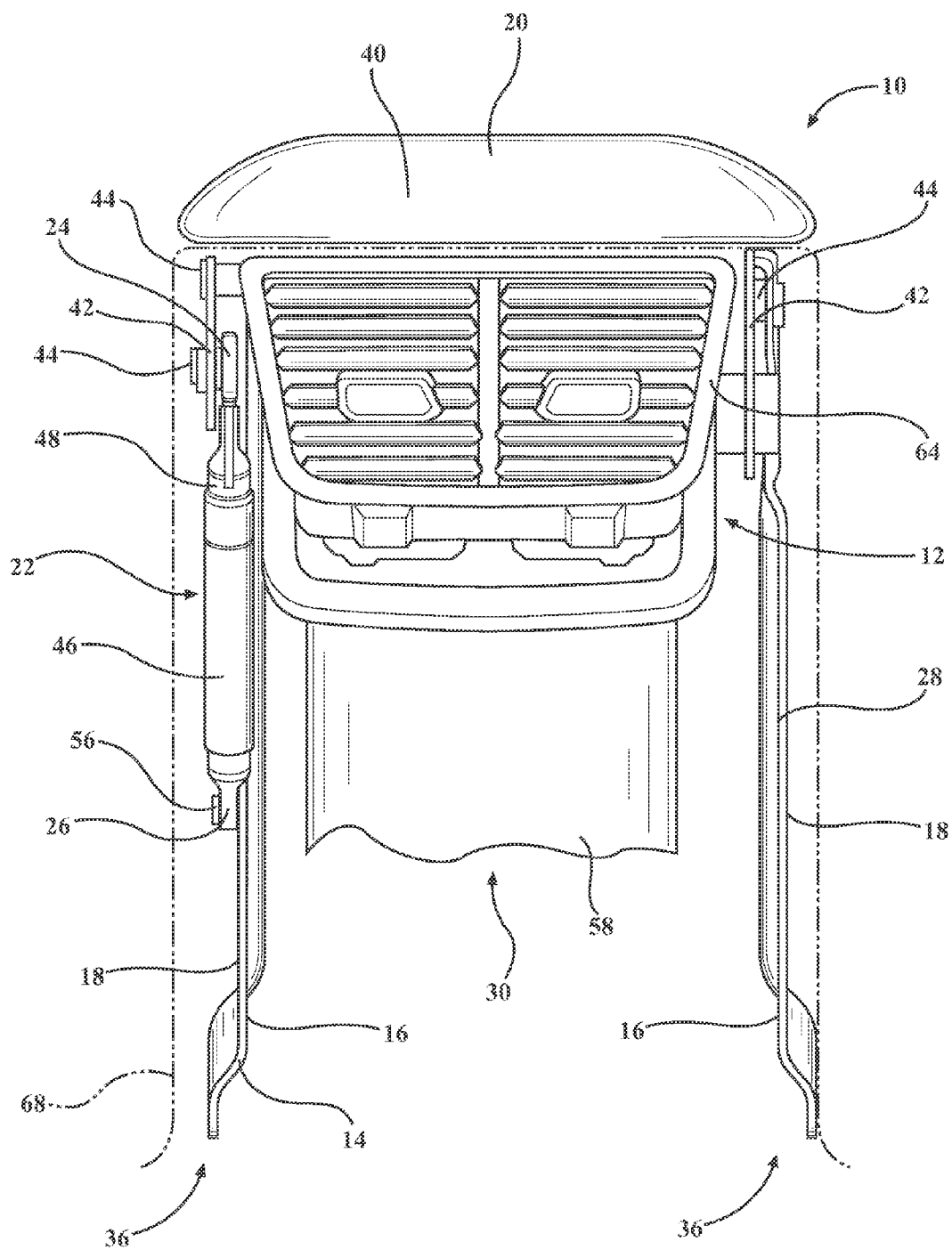
FIG. 2 is a front view of the floor console from the rear passenger area.
Figure 3:
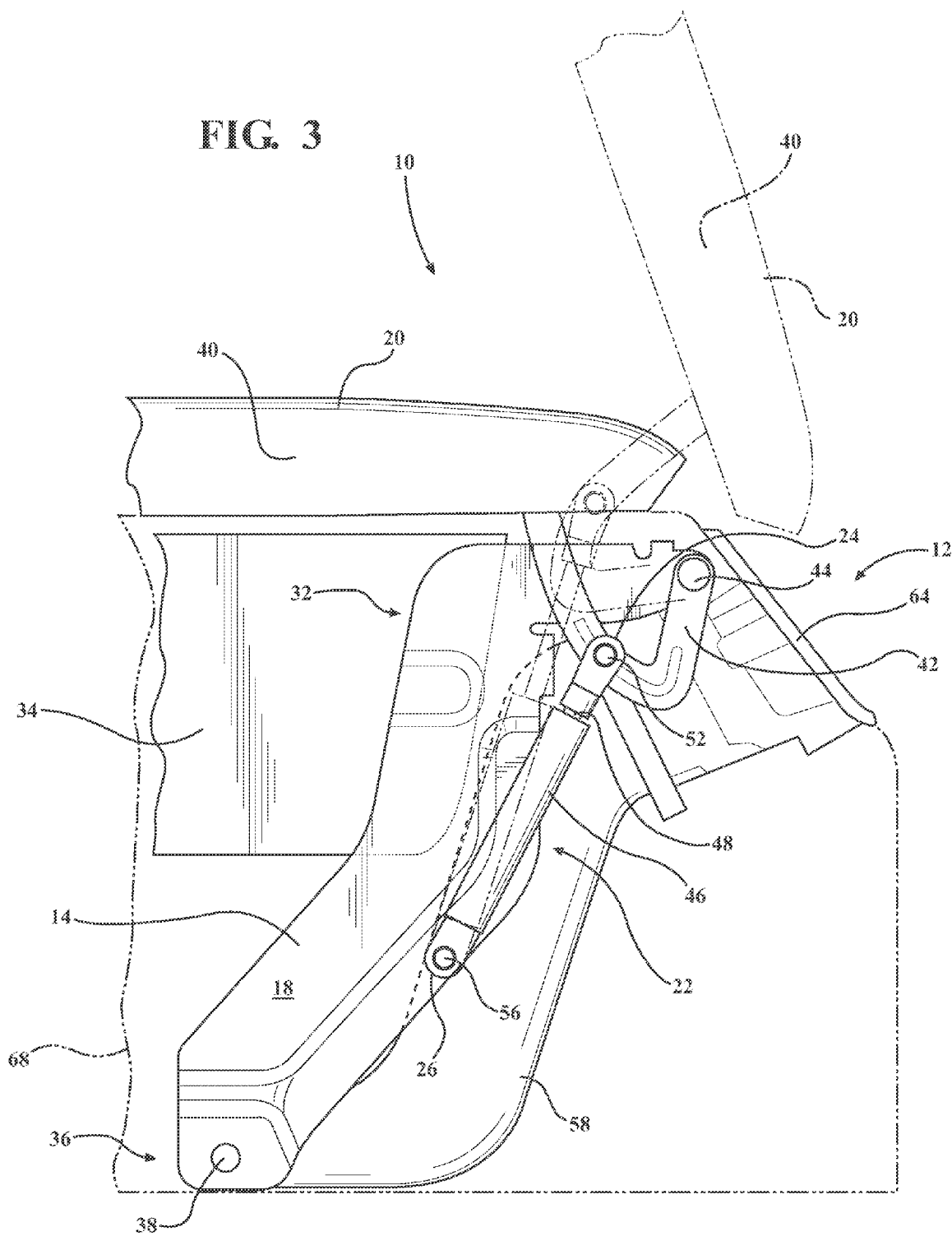
FIG. 3 is a side view of the floor console with an armrest in a closed position shown in solid lines and with the armrest in the open position shown in broken lines.
Figure 4:
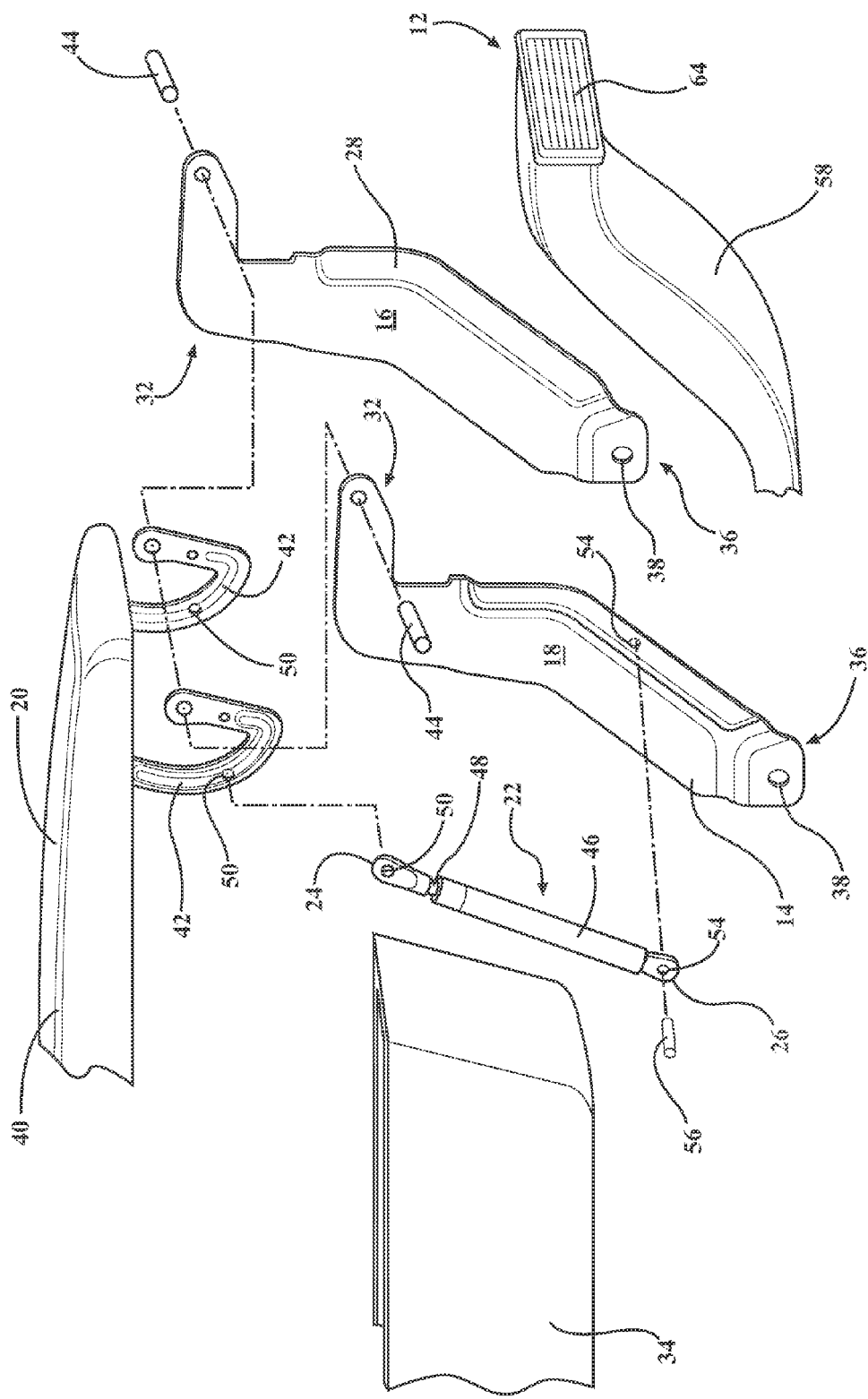
FIG. 4 is an exploded view of the floor console.

With reference to the Figures, wherein like numerals indicate like parts throughout the several views, a floor console 10 of a vehicle 60 includes a climate control unit 12. A bracket 14 of the floor console 10 includes an interior surface 16 facing the climate control unit 12 and an exterior surface 18 opposite the interior surface 16. An armrest 20 is supported by the bracket 14 and is moveable relative to the bracket 14. A gas spring 22 extends from a first end 24 connected to the armrest 20 to a second end 26 connected to the exterior surface 18 of the bracket 14.

When an operator moves the armrest 20 from a closed position to an open position, the gas spring 22 assists in the movement toward the open position, i.e., urges the armrest 20 toward the open position. When the armrest 20 is in the open position, the gas spring 22 urges the armrest 20 toward the open position to retain the armrest 20 in the open position absent sufficient force to overcome the gas spring 22. The operator applies a force to the armrest 20 sufficient to overcome the gas spring 22 to move the armrest 20 from the open position toward the closed position. The gas spring 22 urges the armrest 20 toward the open position while the operator moves the armrest 20 toward the closed position to prevent the armrest 20 from slamming into the closed position, i.e., the gas spring 22 dampens the movement from the open position toward the closed position. This assistance in movement from the closed position to the open position and the resistance against slamming the armrest 20 from the open position to the closed position provides a feeling of superior quality to the operator.

The placement of the second end 26 of the gas spring 22 on the exterior surface 18 of the bracket 14 reduces packaging constraints for the climate control unit 12 on the interior surface 16 of the bracket 14. In other words, the placement of the gas spring 22 such that the second end 26 of the gas spring 22 is connected to the exterior surface 18 of the bracket 14 allows the climate control unit 12 to be placed closer to the interior side of the bracket 14 without interference with the gas spring 22. Thus, more room is available for placement of the climate control unit 12 in a desired location relative to the bracket 14.

The floor console 10 may include a second bracket 28 spaced from the bracket 14 with the climate control unit 12 disposed between the bracket 14 and the second bracket 28. The armrest 20 may be supported by the second bracket 28 and may be moveable relative to the second bracket 28. The second bracket 28 may, for example, be a mirror image of the bracket 14 and may be coupled to the armrest 20 in a similar or identical manner as coupling of the bracket 14 and the armrest 20. The bracket 14 and the second bracket 28 are, for example, formed of a suitable metal such as steel.

The bracket 14 and the second bracket 28 are spaced from each other defining a space 30 therebetween. The climate control unit 12 is disposed in the space 30 between the bracket 14 and the second bracket 28.

The bracket 14 and the second bracket 28 each include a top end 32. The armrest 20 is coupled to the top ends 32 of the bracket 14 and the second bracket 28. The climate control unit 12 is adjacent the top ends 32 of the bracket 14 and the second bracket 28.

The floor console 10 includes, for example, a storage compartment 34 disposed between the armrest 20 and the climate control unit 12. The storage compartment 34 may be disposed in the space 30 between the bracket 14 and the second bracket 28 and may be disposed adjacent the climate control unit 12 at the top end 32 of the bracket 14 and second bracket 28. The bracket 14 and the second bracket 28 may support the storage compartment 34. The armrest 20 may be moved between the open position and the closed position, as set forth above, to uncover and cover the storage compartment 34. The storage compartment 34 may be of any suitable shape and size.

The bracket 14 and the second bracket 28 each include a bottom end 36 spaced from the top end 32 for engaging a floor 70 of a vehicle 60. The bracket 14 and the second bracket 28 may each include an engagement feature 38 for engaging the floor 70. For example, the bracket 14 and the second bracket 28 may include holes (identified with numeral 38) for receiving a fastener (not shown) engaged with the floor 70. When engaged with the floor 70, the bracket 14 and the second bracket 28 may be fixed relative to the floor 70.

The climate control unit 12 is adjacent the bracket 14 and the second bracket 28. In other words, at least a portion of the climate control unit 12 is next to the bracket 14 and the second bracket 28 absent other components between at least a portion of the climate control unit 12 and the bracket 14 and absent other components between at least a portion of the climate control unit 12 and the second bracket 28. The climate control unit 12 may abut at least one of the bracket 14 and the second bracket 28. For example, the climate control unit 12 may abut both the bracket 14 and the second bracket 28 with the climate control unit 12 extending from the bracket 14 to the second bracket 28. More specifically, the climate control unit 12 may be adjacent the top ends 32 of the bracket 14 and the second bracket 28 and may extend from the top end 32 of the bracket 14 to the top end 32 of the second bracket 28.

The armrest 20 may, for example, include a body 40 and at least one arm 42 connecting the body 40 to the bracket 14 and/or the second bracket 28. The arm 42 may have a gooseneck shape, as shown in the Figures. The gooseneck shape assists in desired placement of the body 40 in the open position and the closed position. The arm 42 may be fixed relative to the body 40.

The armrest 20 may be pivotally connected to the bracket 14 and/or the second bracket 28. The bracket 14 and the second bracket 28 may each present connection features 44 pivotally connected to the armrest 20. For example, each arm 42 of the armrest 20 may be pinned to the bracket 14 and the second bracket 28 with pins (identified with numeral 44) pivotally connected to at least one of the armrest 20 and/or the respective bracket 14/second bracket 28. In addition to or in the alternative to pivoting relative to the bracket 14 and/or the second bracket 28, the armrest 20 may be moveable relative to the bracket 14 and/or second bracket 28 in any suitable fashion such as sliding, translating in any direction, etc. The climate control unit 12 may be disposed between the connection features 44.

The gas spring 22 includes a cylinder 46 and a plunger 48 received in the cylinder 46. The plunger 48 telescopically extends from and retracts into the cylinder 46 during operation of the gas spring 22. The gas spring 22 is configured to urge the plunger 48 to telescopically extend from the cylinder 46 and to dampen movement of the plunger 48 telescopically into the cylinder 46.

The cylinder 46 defines a sealed chamber (not shown) enclosing a medium, such as a gas, e.g., nitrogen. In addition to the gas, the cylinder 46 may also enclose a fluid, such as an oil. The plunger 48 includes a piston (not shown) in the sealed chamber defining an orifice through which the gas and/or fluid flows as the plunger 48 moves relative to the cylinder 46.

The plunger 48 presents the first end 24 of the gas spring 22 and the cylinder 46 presents the second end 26 second end 26 of the gas spring 22. The first end 24 may be pivotally coupled to the arm 42 of the armrest 20. For example, the arm 42 and the first end 24 may each define corresponding holes 50 and a pin 52 may pivotally connects the arm 42 and the first end 24 through the holes 50. The second end 26 may be pivotally coupled to the bracket 14. For example, the bracket 14 and the second end 26 may each define corresponding holes 54 and a pin 56 may pivotally connect the bracket 14 and the second end 26 through the holes 54. As shown in the figures, the gas spring 22 pivots relative to the bracket 14 and the armrest 20 as the armrest 20 moves between the open position and the closed position. The cylinder 46 and the plunger 48 may alternatively be connected to the bracket 14 and the arm 42 of the armrest 20, respectively.

The floor console 10 as shown in the figures includes one gas spring 22. However, the floor console 10 may include any suitable number of gas springs 22. The gas spring 22 is connected to the bracket 14 in the figures. Alternatively, or in addition, one or more gas springs 22 may be connected to the second bracket 28.

The climate control unit 12 may include an air duct 58. The air duct 58 may be in fluid communication with a heating/ventilation/air conditioning (HVAC) system. The air duct 58 may be adjacent the bracket 14 and the second bracket 28. In other words, at least a portion of the air duct 58 is next to the bracket 14 and the second bracket 28 absent other components between at least a portion of the air duct 58 and the bracket 14 and absent other components between at least a portion of the air duct 58 and the second bracket 28. The air duct 58 may direct air from the HVAC system toward a rear passenger area 62 of the vehicle 60.

A vent 64 may in communication with the air duct 58. The vent 64 may be disposed between the top ends 32 of the bracket 14 and the second bracket 28. The vent 64 may be supported by the air duct 58 and/or other components of the floor console 10. The vent 64 may be configured to direct air from the air duct 58 toward the rear passenger area 62 of the vehicle 60.

In addition to or in the alternative to the air duct 58, the climate control unit 12 may include electronic components 66. For example, the electronic components 66 may include inputs, such as knobs, buttons, switches, a graphical user interface, etc., for controlling the HVAC system. The electronic components 66 may face the rear passenger area 62 of the vehicle 60 for control by occupants (not shown) in the rear passenger area 62.

The floor console 10 may include a cover 68 that covers the bracket 14 and the second bracket 28. The cover 68 provides an aesthetic appearance. The cover 68 may be, for example, formed of vinyl or other suitable material.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A floor console comprising:
   a climate control unit;
   a bracket including an interior surface facing the climate control unit and an exterior surface opposite the interior surface;
   an armrest supported by the bracket and moveable relative to the bracket; and
   a gas spring extending from a first end connected to the armrest to a second end connected to the exterior surface of the bracket.

2. The floor console as set forth in claim 1 further comprising a second bracket spaced from the bracket with the climate control unit disposed between the bracket and the second bracket.

3. The floor console as set forth in claim 2 wherein the climate control unit is adjacent the bracket and the second bracket.

4. The floor console as set forth in claim 2 wherein the bracket and the second bracket each present connection features pivotally connected to the armrest and wherein the climate control unit is disposed between the connection features.

5. The floor console as set forth in claim 2 wherein the bracket and the second bracket each include a top end and wherein the climate control unit is adjacent the top ends of the bracket and the second bracket.

6. The floor console as set forth in claim 5 wherein the bracket and the second bracket each include a bottom end spaced from the top end for engaging a floor of a vehicle.

7. The floor console as set forth in claim 2 wherein the armrest is supported by and moveable relative to the second bracket.

8. The floor console as set forth in claim 7 wherein the armrest is pivotally connected to the bracket and the second bracket.

9. The floor console as set forth in claim 2 wherein the climate control unit includes an air duct adjacent the bracket and the second bracket.

10. The floor console as set forth in claim 1 wherein the climate control unit is adjacent the bracket.

11. The floor console as set forth in claim 1 wherein the gas spring includes a cylinder and a plunger received in the cylinder.

12. The floor console as set forth in claim 11 wherein the plunger presents the first end and the cylinder presents the second end.

13. The floor console as set forth in claim 1 wherein the climate control unit includes an air duct.

14. The floor console as set forth in claim 1 wherein the climate control unit includes electronic components.

15. The floor console as set forth in claim 1 wherein the bracket includes a top end and a bottom end spaced from the top end and wherein the climate control unit is adjacent the top end.

16. The floor console as set forth in claim 1 wherein the armrest is pivotally connected to the bracket.

17. The floor console as set forth in claim 1 wherein the bracket includes an engagement feature for engaging a floor of a vehicle.

* * * * *